United States Patent [19]

Monk

[11] Patent Number: 4,509,550

[45] Date of Patent: Apr. 9, 1985

[54] WATER TEMPERATURE DISPLAY AND FLOW CONTROL APPARATUS

[76] Inventor: Kermit R. Monk, 122 Oakland Dr., Cross Lanes, W. Va. 25313

[21] Appl. No.: 475,444

[22] Filed: Mar. 14, 1983

Related U.S. Application Data

[63] Continuation-in-part of Ser. No. 411,097, Aug. 24, 1982, abandoned.

[51] Int. Cl.³ .............................................. F03B 7/07
[52] U.S. Cl. .................................. 137/551; 137/897; 251/127; 374/148
[58] Field of Search ............. 374/147, 148; 236/93 B; 251/127; 137/896–898, 551

[56] References Cited

U.S. PATENT DOCUMENTS

| | | | |
|---|---|---|---|
| 630,315 | 8/1899 | Barclay | 251/127 |
| 899,201 | 9/1908 | Braybrook | 137/551 |
| 1,064,660 | 6/1913 | Klee | 251/127 |
| 1,384,132 | 7/1921 | Holm | 374/147 X |
| 1,498,788 | 6/1924 | Deming | 251/127 X |
| 2,511,291 | 6/1950 | Mueller | 251/127 X |
| 2,626,524 | 1/1953 | Harman | 374/148 |
| 3,960,016 | 6/1976 | Symmons | 374/148 |
| 3,981,266 | 9/1976 | Persson | 374/147 X |
| 4,161,881 | 7/1979 | Raz | 374/147 |

FOREIGN PATENT DOCUMENTS

| | | | |
|---|---|---|---|
| 281706 | 1/1915 | Fed. Rep. of Germany | 374/148 |
| 441361 | 3/1912 | France | 251/127 |
| 15914 | of 1905 | United Kingdom | 251/127 |

*Primary Examiner*—William E. Tapolcai
*Attorney, Agent, or Firm*—Lowe, King, Price & Becker

[57] ABSTRACT

Apparatus for determining and displaying the temperature of a mixture of two liquid streams, such as hot and cold water mixed in a shower supply line, includes a flow control valve for varying the flow rate of the mixed water independently from adjustment of temperature mixing and control valves. The apparatus includes structure for more uniformly mixing the two streams and for providing improved homogeneity of temperature in the mixture. A baffle is provided at the inlet of the device for redirecting the incoming mixture to a mixing chamber prior to exposure of a thermometer thereto. The flow control valve increases back pressure at the outlet thereby further to improve temperature uniformity of the outlet stream. The apparatus may be installed intermediate existing plumbing connections and does not require the use of specialized shower heads.

15 Claims, 4 Drawing Figures

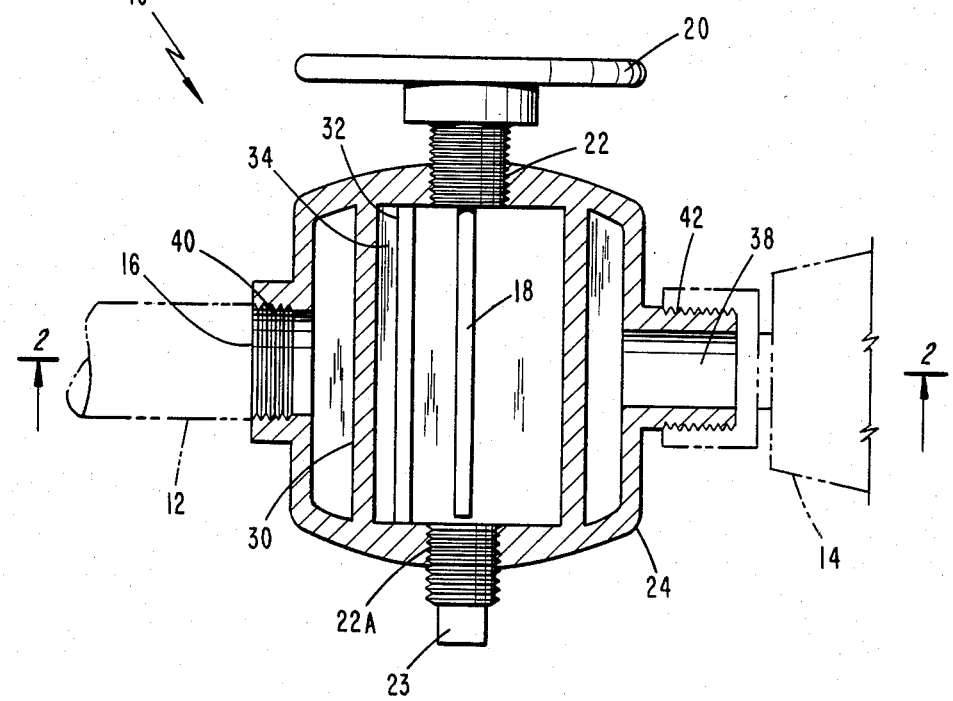
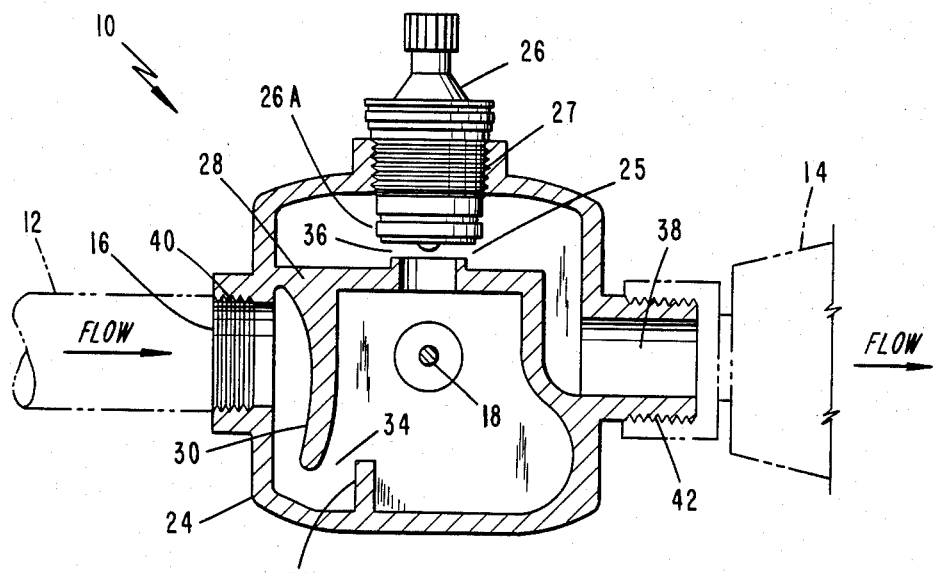

WATER TEMPERATURE DISPLAY AND FLOW CONTROL APPARATUS

This application is a continuation-in-part of my co-pending application, Ser. No. 411,097, filed Aug. 24, 1982, for Water Temperature Display and Equalization Apparatus, now abandoned, the disclosure of which is incorporated herein by reference.

BACKGROUND OF THE INVENTION

This invention relates to temperature control apparatus for mixed liquid streams of different temperatures, and more specifically to apparatus for equalizing temperature within such a flowing mixture, for detecting and displaying the temperature of the resulting mixture and for controlling the flow of the mixture.

In modern plumbing fixtures it is known to provide variable temperatures to a stream of water by mixing two streams of different temperatures. Thus, by mixing streams of water at two predetermined temperatures it is possible to obtain a resulting stream having any temperature intermediate the two predetermined temperatures by appropriately varying the control settings of valves used in mixing the two streams. However, when applying such variable temperature streams against various portions of the human anatomy, it is often difficult to predict the resulting water temperature merely by a predetermined setting of the mixing valve. There is thus a possibility of unnecessarily scalding or chilling the body when attempting to regulate the water temperature in a bath or shower, for example. Such temperature shocks are uncomfortable and may be unhealthful for the bather.

Moreover, where a container, such as a bathtub, is filled to a predetermined level with water believed to be regulated at a desired temperature, such uncomfortable temperatures lead to the use of additional quantities of water, thereby wasting both water and the energy needed to heat or cool the water.

The prior art has attempted to solve the problem of selecting a desired temperature for a water stream by inserting a thermometer into the flow path of the stream. For example, the U.S. Pat. No. 2,626,524 to Harman discloses a shower spray head assembly containing a thermometer having a dial indicator to display the temperature of water entering the spray head from a pipe. The water is then outlet through a perforated cap.

U.S. Pat. No. 4,161,881 to Raz describes a similar hand-held unit including either a dial or mercury-type thermometric display at its rearward end.

These and other prior art devices thus provide means for measurement of temperature of water or other liquids issuing through a faucet or other outlet. However, such prior art devices typically require the use of specialized structures and, where used with shower spray heads, thus require the use of specially designed shower heads. Additionally, these devices function with the water stream as input thereto from the supply lines. Thus, in the event of a nonhomogeneous mixture of water streams of different temperatures in the supply line, the temperature displayed by the prior art devices may be erroneous.

Prior art devices for indicating the outlet temperature of a mixed water stream thus subject the users thereof to thermal shock in order to observe the temperature reading, require specialized spray heads, are not fully reliable, and are accordingly complex and expensive.

In applicant's prior copending application there is described apparatus including baffles therein for more thoroughly mixing a stream of two components and providing a temperature measurement and display structure for the mixed stream. However, in order to shut off the output stream, the separate control valves in the supply lines for the two streams are required to be closed. Moreover, regulation of flow rate for the output stream requires manipulation of the separate control valves. In both situations, the mixture ratios are affected and readjustment of the mixture is required to maintain the desired temperature.

OBJECTS AND SUMMARY OF THE INVENTION

It is accordingly an object of the present invention to overcome the difficulties in the prior art and to provide a controllable apparatus for equalizing the temperature of a mixture of hot and cold liquids, for displaying the resultant temperature of the mixed liquid delivered thereby and for controlling the flow rate of the mixed liquid.

It is a more specific object of the invention to provide apparatus for controlling flow rate of water provided in a plumbing fixture at a preset temperature and to display the temperature of the water provided thereby.

It is still a further object of the invention to provide a temperature display apparatus including means for controlling the flow of temperature controlled water supplied by a plumbing fixture without affecting the temperature controls therefor.

Yet another object of the invention is the provision of apparatus for displaying temperature and for controlling liquid flow, the apparatus being easily installed within existing plumbing connections.

Still other objects and features of the present invention will become more readily apparent to those skilled in the art from the following description wherein there is shown and described a preferred embodiment of the invention, simply by way of illustration of one of the best modes contemplated for carrying out the invention. As will be realized, the invention is capable of other, different, embodiments and its several details are capable of modifications in various obvious aspects, all without departing from the invention. Accordingly, the drawing and description are provided for illustration and not for limitation of the invention.

BRIEF DESCRIPTION OF THE DRAWING

The foregoing and other features, objects and advantages of the present invention will be more readily appreciated upon reference to the following description of a preferred embodiment of the invention, when taken in conjunction with the accompanying drawing in which:

FIG. 1 shows a top sectional view of a preferred embodiment of the present invention in conjunction with a water supply line and a shower spray head;

FIG. 2 shows a view of the invention taken along the line 2—2 of FIG. 1;

Figure 3:
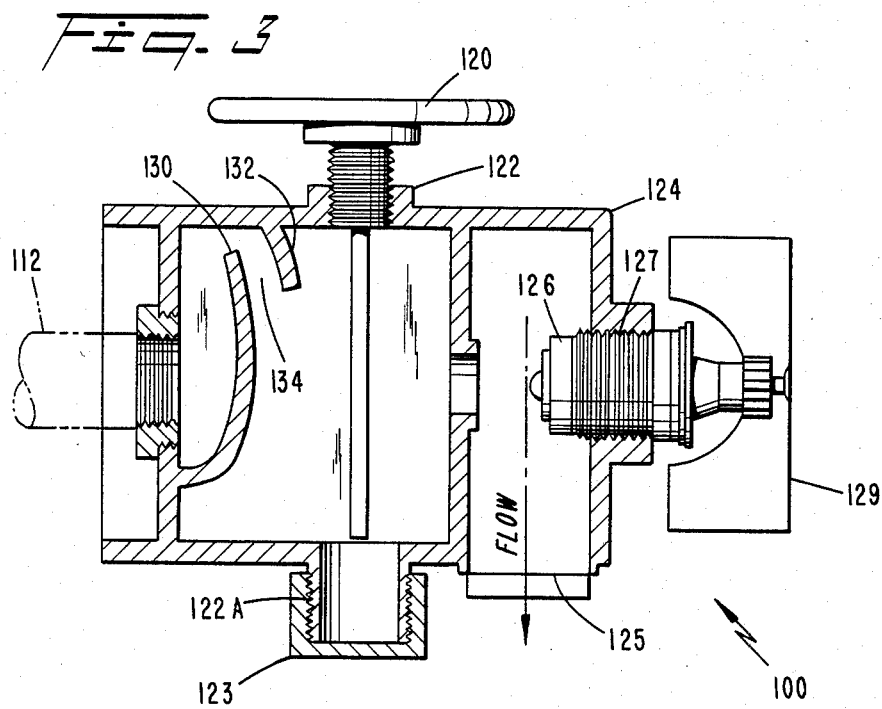
FIG. 3 shows a sectional view of an alternate embodiment of the present invention applicable to a bathtub control apparatus.

In accordance with the present invention, an apparatus 10 is shown in FIGS. 1 and 2 to be inserted between an existing water supply line 12 and an existing shower head 14 (not a part of the invention and shown in broken lines) supplied thereby.

As is seen from FIGS. 1 and 2, the inventive apparatus includes an inlet means 16 and a temperature sensing means 18 in a chamber receiving the water from the supply line 12. Preferably, the temperature sensing means includes a bimetallic temperature sensor subjected to the water flow, and a display dial 20 operatively connected and responsive thereto for indicating the temperature of outlet water to a user. However, as is known in the art, a mercury thermometer, or other temperature measuring device may be inserted into the housing of apparatus 10 and electronic displays may be used to provide similar temperature indication to a user.

Whether a bimetallic, dial display type of thermometer or a liquid bulb type of thermometer is used, however, it is contemplated that the temperature sensing means 18 and the display 20 therefor be connected through a threaded connection, generally shown in FIG. 1 at 22, passing through housing 24 of the apparatus. The connection may include female threads in the housing for mating with male threads on the temperature measuring device, or may provide for passage of a connecting portion between the display 20 and the temperature sensor 18 through a sealed passageway in the housing. An alternate location of the temperature display is at the opposite side of housing 24, and is indicated at an optional connection 22A, sealed by a plug 23.

An outlet means 25, shown in FIG. 2, is provided in the apparatus for supplying the water, after detection and display of its temperature, to the existing shower head 14. Outlet means 25 comprises a valve seat for a valve structure 26, passing through an opening 27 in housing 24. The valve structure includes a reversible gasket 26A, to provide positive shutoff of the passageway through valve seat 25. The gasket may be reversed to provide trickle valve operation. Although a compression type valve is shown, it should be recognized that other valve structures may be used in the inventive structure for controlling flow of the liquid therethrough.

The water provided through supply line 12 is typically comprised of streams of cold and hot water, passing through separate control valves therefor (not shown). In order to provide a more thorough mixing of the water streams of different temperatures passing through the supply line 12, and further to provide a more homogeneous distribution of temperature therethrough, there is provided a mixing means 28 adjacent the inlet 16 for the apparatus. The mixing means 28 preferably includes a first baffle 30, a second baffle 32, and a mixing chamber 34.

In operation, water passing through inlet 16 impinges on first baffle 30 which is shaped for deflecting the flowing water stream in a folded path, thereby providing a more thorough mixing of its various component flowstreams. Baffle 30 is oriented for redirecting the water stream towards mixing chamber 34 for further mixing of its various substreams and for impinging the resulting stream on second baffle 32. The second baffle is also shaped for redirecting water flow, thereby to provide further mixing of the incoming stream. Moreover, second baffle 32 is further specifically oriented and shaped for directing the thus more thoroughly mixed water stream against the chamber including temperature sensor 18. Preferably, baffle 30 is concavely curved and baffle 32 is linearly shaped. However, other baffle shapes may be used without departing from the invention.

Accordingly, the present invention prevents the incoming water stream from directly impinging on the temperature sensing means, but instead provides for further mixing of the water stream in a mixing structure including a pair of baffles and a mixing chamber. While either or both baffles may be eliminated, it is appreciated that both uniformity of temperature distribution and the reliability of the temperature indication provided by the invention are enhanced by the more thorough mixing for the incoming water provided by these baffles. However, such mixing may be provided by structures other than the presently contemplated baffles.

In order further to enhance reliability of the temperature reading provided on display dial 20, the temperature sensing means 18 is disposed preferably perpendicularly to the incoming water stream, thereby itself to act as a baffle therefor and to increase the mixing of the water. Moreover, by exposing the temperature sensing means to a perpendicular cross section of the water stream, the possibility of an erroneous temperature reading which might be obtained in a laminar flow of the water is reduced.

As still a further structure for providing more uniform temperature distribution in the water delivered by the inventive apparatus, there is provided, as part of the outlet valve seat 25 and valve structure 26, a further mixing means in order to further the homogenization of temperature distribution within the delivered water. Specifically, the valve defines a constricting passage 36 in the vicinity of an outlet passageway 38. The valve, in addition to controlling water flow, thus reduces the cross sectional area of the passage 36 to be less than the cross sectional area of the incoming passageway provided in inlet means 16. The increased back pressure resulting from the constricted passageway thus delays passage of the output water and permits the desired further reduction of temperature variations throughout the liquid.

In order to permit the inventive apparatus to be easily installed in an existing plumbing connection, the inlet means 16 includes an inlet coupling 40 for a connection to supply line 12. Inlet coupling 40 is preferably substantially identical with the inlet coupling provided for the existing shower head 14. Moreover, outlet passageway 38 includes an outlet coupling 42 for mating with the inlet coupling of the shower head 14. Preferably, outlet coupling 42 is substantially identical with the outlet coupling of supply line 12.

It is thus seen that, by supplying an inlet coupling 40 similar to the inlet coupling of the shower head, and by supplying the outlet coupling 42 similar to the outlet coupling of supply line 12, the inventive apparatus 10 may be coupled intermediate an existing supply line 12 and a shower head 14 connection without requiring the use of specially designed shower heads or supply lines. For example, where a half-inch outer diameter supply line is used for threaded connection with half-inch inner diameter coupling of the shower head, the inlet coupling of the inventive apparatus would similarly be half-inch inner diameter, while the outlet coupling would preferably be threaded with a half-inch outer diameter. It should be understood, however, that the coupling structure need not be a threaded coupling, but may correspond to any desired coupling structure.

For a threaded coupling, however, it is thus apparent that the present apparatus may be provided in different sizes to correspond to different supply lines and shower heads. Alternatively, a single, universal temperature equalizing and display device may be provided with inlet and outlet adapters for coupling to supply line connections of differing diameters.

In order to avoid the necessity for exposure of a user to the oncoming water stream deliverd by the inventive apparatus to the shower head and output thereby, the present invention provides placement of the display dial at the side of the shower head. Accordingly, a user may regulate the water temperature by manipulation of the hot and cold water mixing valves while observing the resulting water temperature safely from the side of the shower, rather than being required to stand in front of the shower spray with the resultant exposure to the unregulated water stream. Thus, the temperature display is preferably positioned for easy viewing from a point external to the general flow of the water stream.

Advantageously, valve 26 is provided in the inventive apparatus for adjusting flow rate of the mixed liquid. Thus, once a desirable temperature setting is achieved by manipulation of the hot and cold water mixing or control valves, flow rate may be adjusted without affecting the temperature setting. For example, in a shower the flow may be reduced or completely shut off for a period of time without manipulating the mixing control valves. At a later time the same water temperature may be easily attained (assuming the temperatures of the source hot and cold water streams have not changed) by simple operation of valve 26. In a common situation, a bather in a shower needs only to shut off valve 26 if, due to a sudden drain on the cold water supply (as occasioned by flushing of a commode, for example) the temperature of the outlet water suddenly and temporarily changes. After passage of the temporary condition, valve 26 may be opened to permit resumption of flow at the original temperature.

Figure 4:
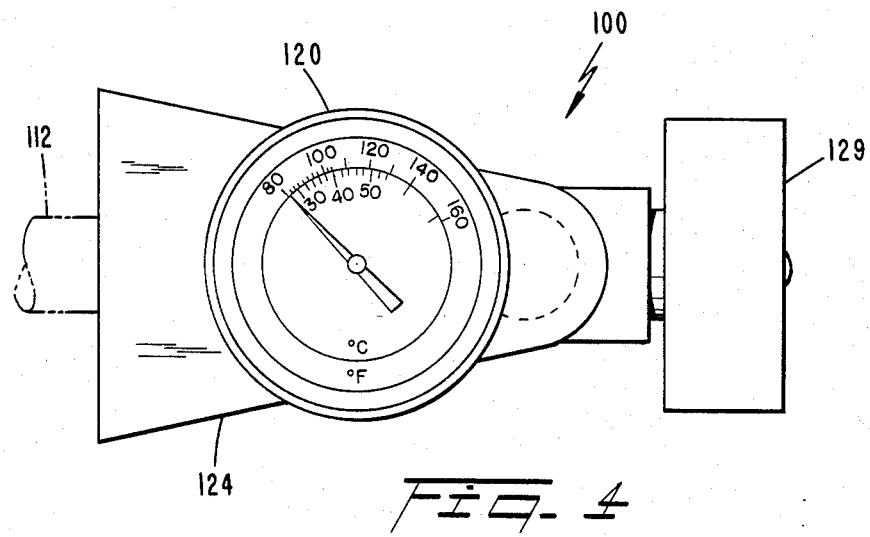
FIG. 4 shows a top view of the structure of FIG. 3.

Referring now to FIGS. 3 and 4, there is shown an alternate embodiment of the present invention for use with a bathtub filler control. As shown herein, the inventive structure may be incorporated in a fixture 100 coupled to an existing water-supply line 112. The inlet to the inventive fixture includes a baffle 130 for redirecting the incoming water flow to a mixing chamber 134 and a second baffle 132. A dial (or mercury) thermometer is shown at 120, having a threaded connection 122 with housing 124 of the fixture. An optional connection 122A is provided for positioning thermometer 120 at the other side of the bathtub fixture 100. A cap 123 seals connection 122A. An outlet means 125 is formed of a controllable cutoff valve 126, passing through an opening 127 and controlled by a handle 129. The cutoff valve 126 may be controlled to reduce or shut off flow of the mixed water stream, after temperature detection, similarly to operation of valve 26 in the embodiment of FIGS. 1 and 2. Additionally, a control may be provided to direct water flow either to outlet 125 or to a shower outlet, not shown.

There have thus been described inventive structures for uniformly distributing temperature variations in water or other liquids to be delivered thereby, for measuring and displaying the temperature and for controlling flow of the uniformly mixed liquid. The inventive structure may be applied as an intermediate device between an existing supply line on an existing utilization apparatus, such as a shower head, or may be incorporated in a fixture having its own outlet.

In both of the described embodiments, there is provided a mixing chamber for thoroughly mixing the incoming liquid prior to measurement of the temperature thereof, and a temperature sensing chamber for measurement of the temperature of the mixed liquid prior to its delivery to the outlet means. A control valve is provided to regulate flow of the temperature regulated liquid. Further, the temperature of the liquid is equalized throughout its volume by operation of the control valve as a mixing means at the outlet side of the invention. Such further mixing is enabled by the increased back pressure within the device provided by the control valve.

The foregoing description of the preferred embodiments of the invention has been presented for purposes of illustration and description, and is not intended to be exhaustive or to limit the invention to the precise forms disclosed. The embodiments were chosen and described in order best to explain the principles of the invention and its practical application, thereby to enable others skilled in the art best to utilize the invention in various embodiments and with various modifications as are suited to the particular use contemplated. I wish it to be understood that I do not desire to be limited to the exact details of construction shown and described, for obvious modifications can be made by a person skilled in the art.

I claim:

1. Regulating apparatus for regulating a temperature of a liquid mixture provided as a mixture of two streams of liquid at first and second temperatures, comprising:
    inlet means connected for providing said liquid mixture to the regulating apparatus;
    a chamber within said regulating apparatus receiving said liquid mixture from said inlet means;
    a temperature sensing means disposed within said chamber for detecting the temperature of said liquid mixture provided by said inlet means; and
    flow control means, comprising a valve structure disposed at an outlet of said chamber, for controlling flow of said liquid mixture from said chamber to an outlet from said regulating apparatus
    said inlet means including mixing means for more thoroughly mixing said liquid mixture provided to said temperature detecting means than in the mixture provided by a supply line for said liquid,
    said mixing means comprising baffle means,
    said baffle means including a baffle shaped for deflecting flow of said liquid mixture and for redirecting said flow, together with a second baffle means, oriented for receiving the redirected flow from said first mentioned baffle means and for further redirecting said flow towards said temperature sensing means.

2. Regulating apparatus for regulating a temperature of a liquid mixture provided as a mixture of two streams of liquid at first and second temperatures, comprising:
    inlet means connected for providing said liquid mixture to the regulating apparatus;
    a chamber within said regulating apparatus receiving said liquid mixture from said inlet means;
    a temperature sensing means disposed within said chamber for detecting the temperature of said liquid mixture provided by said inlet means; and
    flow control means, comprising a valve structure disposed at an outlet of said chamber, for controlling flow of said liquid mixture from said chamber to an outlet from said regulating apparatus
said inlet means including mixing means for more thoroughly mixing said liquid mixture provided to said temperature detecting means than in the mixture provided by a supply line for said liquid,
said outlet including a passageway for delivering said more thoroughly mixed liquid mixture to a utilization apparatus,
said flow control means being further operable for increasing back pressure in said chamber whereby temperature of the liquid mixture is further equalized prior to delivery to said utilization apparatus
said utilization apparatus comprising a shower spray head, the temperature for said liquid mixture being set by a control structure therefor, said flow control means operable for controlling flow of said liquid mixture independently of temperature settings therefor.

3. Regulating apparatus for regulating a temperature of a liquid mixture provided as a mixture of two streams of liquid at first and second temperatures, comprising;
  inlet means connected for providing said liquid mixture to the regulating apparatus;
  a chamber within said regulating apparatus receiving said liquid mixture from said inlet means;
  a temperature sensing means disposed within said chamber for detecting the temperature of said liquid mixture provided by said inlet means; and
  flow control means for controlling flow of said liquid mixture from said chamber to an outlet from said regulating apparatus
  said regulating apparatus incorporated in a plumbing fixture receiving said liquid mixture at temperatures determined by setting flow rates for the two streams at said first and second temperatures, said flow control means operable for controlling flow of said liquid mixture independently of the flow rates set for the two streams to determine the temperature of said liquid mixture.

4. The apparatus of claim 3 wherein said regulating apparatus is incorporated in bathtub filler control apparatus.

5. Water temperature display and equalization apparatus comprising:
  (a) inlet means for connection to a supply line supplying a mixture of hot and cold water;
  (b) mixing means receiving said mixture of hot and cold water from said inlet means for further mixing said mixture of hot and cold water thereby improving temperature distribution therein;
  (c) said mixing means including:
    (i) baffle means and
    (ii) mixing chamber means receiving the flowing mixture from said baffle means;
  (d) water temperature sensing means for detecting the temperature of the further mixed hot and cold water;
  (e) water temperature display means responsive to said sensing means for displaying the detected water temperature;
  (f) outlet means for providing the further mixed hot and cold water to a utilization device; and
  (g) flow control means for controlling flow of the further mixed hot and cold water to said utilization device operable for controlling the flow rate of a mixture of hot and cold water supplied to the utilization device independently of the mixture ratio of said hot and cold water and thus independently of the temperature setting thereof.

6. The apparatus of claim 5 wherein said flow control means is operable for providing further homogenization in temperature distribution within said water provided to said utilization apparatus.

7. The apparatus of claim 6 wherein said flow control means comprises means for increasing back pressure in said mixing means, whereby there is provided improved water temperature distribution in the water provided to the utilization device.

8. The apparatus of claim 5 wherein said utilization device comprises a shower spray head connected to said supply line, and
  wherein said inlet means and said outlet means comprise means for coupling the display and equalization apparatus intermediate said supply line and said shower spray head,
  said inlet means including coupling means substantially identical to coupling means provided in the shower spray head for coupling to the supply line, and
  said outlet means including coupling means substantially identical to coupling means provided in the supply line for coupling to the shower spray head.

9. The apparatus of claim 5 wherein said water temperature display means is disposed sidewardly of the outlet means whereby a user may read the display means by viewing the apparatus from a viewpoint external to the flow plane of the water mixture.

10. Water temperature display and equalization apparatus comprising:
  (a) inlet means for connection to a supply line supplying a mixture of hot and cold water;
  (b) mixing means receiving said mixture of hot and cold water from said inlet means for further mixing said mixture of hot and cold water thereby improving temperature distribution therein;
  (c) said mixing means including:
    (i) baffle means and
    (ii) mixing chamber means receiving the flowing mixture from said baffle means;
  (d) water temperature sensing means for detecting the temperature of the further mixed hot and cold water;
  (e) water temperature display means responsive to said sensing means for displaying the detected water temperature;
  (f) outlet means for providing the further mixed hot and cold water to a utilization device; and
  (g) flow control means for controlling flow of the further mixed hot and cold water to said utilization device whereby the flow rate of a mixture of hot and cold water supplied to a utilization apparatus is variable independently of the mixture ratio of said hot and cold water and thus independently of the temperature setting thereof, the temperature of said mixture being detected and displayed,
  second baffle means for receiving the flowing mixture from said first mentioned baffle means and for redirecting the mixture towards said temperature sensing means.

11. Water flow control apparatus for a mixture of hot and cold water comprising, in combination:
  (a) mixing means receiving said mixture of hot and cold water for providing a uniform temperature distribution therethrough, including (i) at least a first baffle for integrating two streams of hot and cold water to a single stream having an intermediate temperature, said baffle located at an inlet of said apparatus (ii) a mixing chamber receiving said single stream having said intermediate temperature;

(b) water temperature measuring means located within said mixing chamber for measuring the temperature of said single integrated stream of water;

(c) water temperature display means for displaying to a user the measured temperature of said integrated single stream of water, said water temperature display means located externally of said chamber and at an external portion of said apparatus for viewing by the user;

(d) retrofitting coupling means for mounting said apparatus between a water conduit conveying said mixture of hot and cold water and a utilization device, said retrofitting coupling means including (i) an inlet means for said apparatus substantially identical to an inlet of the utilization device and (ii) an outlet means for said apparatus having a mounting portion substantially identical to an existing outlet of said water conduit (iii) said inlet and outlet means operable for connecting said apparatus to the existing outlet of said water conduit and the inlet of the utilization device, respectively; and (e) flow control means for controlling flow of the integrated single stream of water at the intermediate temperature to the utilization device by varying the rate of flow of said integrated stream to the utilization device independently of a mixture ratio of said hot and cold water and of the temperature setting thereof, including:

(i) a valve seat provided in the outlet of said apparatus and a movable valve structure cooperating therewith;

(ii) means for increasing back pressure in said apparatus; and (iii) second baffle means for redirecting the integrated stream towards said temperature measuring means to provide more uniform temperature distribution in said integrated stream of water and an increased accuracy of the displayed temperature measurement.

12. Apparatus as recited in claim 11 wherein said valve seat is provided in an outlet of said mixing chamber defining a passageway for said integrated stream of intermediate temperature water, said passageway having a smaller cross section than an incoming passage for said mixture provided in said inlet means for providing said increased back pressure in said apparatus.

13. The apparatus of claim 1 wherein said valve structure includes a valve seat formed in the outlet of said chamber and a valve movable toward and away from the valve seat for providing varying degrees of resistance to flow of said liquid mixture to the outlet from said regulating apparatus.

14. The apparatus of claim 1 further comprising temperature display means responsive to said temperature sensing means for displaying the temperature of said liquid mixture.

15. The apparatus of claim 1 wherein said outlet includes a passageway for delivering said more thoroughly mixed liquid mixture to a utilization apparatus, said flow control means being further operable for increasing back pressure in said chamber whereby temperature of the liquid mixture is further equalized prior to delivery to said utilization apparatus.

* * * * *